US006796769B2

(12) United States Patent
Moroso

(10) Patent No.: US 6,796,769 B2
(45) Date of Patent: Sep. 28, 2004

(54) RADIAL RETAINER FOR SINGLE LOBE TURBINE BLADE ATTACHMENT AND METHOD FOR RADIALLY RETAINING A TURBINE BLADE IN A TURBINE BLADE SLOT

(75) Inventor: Joseph Leonard Moroso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 22 days.

(21) Appl. No.: 10/065,316

(22) Filed: Oct. 2, 2002

(65) Prior Publication Data

US 2004/0067137 A1 Apr. 8, 2004

(51) Int. Cl.[7] ............................ B63H 1/20; B63H 5/00; B63H 13/00; B63H 15/00; B64C 11/04

(52) U.S. Cl. ........................................................ 416/221

(58) Field of Search ............................ 416/221, 220 R, 416/248

(56) References Cited

U.S. PATENT DOCUMENTS

| | | | | | |
|---|---|---|---|---|---|
| 2,586,176 | A | * | 2/1952 | Olsen | 353/109 |
| 2,847,187 | A | * | 8/1958 | Murphy | 416/221 |
| 3,598,503 | A | * | 8/1971 | Muller | 416/221 |
| 5,713,721 | A | | 2/1998 | Glynn et al. | |
| 6,398,500 | B2 | | 6/2002 | Pedersen et al. | |
| 6,447,253 | B2 | * | 9/2002 | Tempere | 416/221 |

* cited by examiner

*Primary Examiner*—Ninh H. Nguyen
(74) *Attorney, Agent, or Firm*—Nixon & Vanderhye PC

(57) ABSTRACT

The invention provides for a simple and inexpensive fabrication to provide radial position retention to minimize the problems associated with single lobe attachment radial slop.

20 Claims, 5 Drawing Sheets

RADIAL RETAINER FOR SINGLE LOBE TURBINE BLADE ATTACHMENT AND METHOD FOR RADIALLY RETAINING A TURBINE BLADE IN A TURBINE BLADE SLOT

BACKGROUND OF THE INVENTION

This invention relates to turbo machinery rotor construction and, more particularly, to a structure for radially retaining the rotor blades with respect to the rotor disk of a turbo machine.

Turbo machinery such as high performance gas turbine engines have a compressor and turbine, each of which includes one or more annular banks or rows of fixed stator vanes that are positioned between rows of rotatable rotor blades. Each rotor blade is formed with a rotor tip, an airfoil and a dovetail-shaped base or root that is mounted within a mating slot. The dovetail attachment of the turbine blade to the rotor may be defined as a single lobe attachment or a multi-lobe attachment. A dovetail attachment inherently results in an assembly having a measure of radial play to allow axial sliding placement of the turbine blades. The radial play is referred to as radial slop.

Turbine blades with multi-lobe attachments have little radial slop by the inherent nature of the design. The left illustration of FIG. 1 shows a multi-lobe attachment 10 in the running position with the turbine blade loaded radially outwardly. The right illustration of FIG. 1 shows the same blade 10 in the installed position, loaded radially in. As noted, there is a radial position shift delta or slop $D_m$ relative to the rotor or hub disk 12.

In contrast, turbine blades with single lobe attachment inherently have a large amount of radial slop. Referring to FIG. 2, on the left a single lobe turbine blade 14 is illustrated in its running position, loaded radially outwardly. The same turbine blade 14 in its installed position, loaded radially inwardly, is illustrated on the right in FIG. 2. As shown, turbine blades with single lobe attachments have significant radial position shift or delta slop $D_s$ relative to the rotor disk or hub 16 due to the design. As illustrated in FIG. 3, the radial slop of the turbine blades having single-lobe attachment results in radial mismatch between blades. Radial slop combined with single lobe dovetail creates large platform gaps between blades allowing seals and dampers to fall out. Also, the radial mismatch between adjacent blades causes issues with feather seal slot-alignment and platform damper alignment. Moreover, as illustrated in FIG. 4, the radial slop of the single lobe configuration permits blades to rock when not seated on the pressure face.

SUMMARY OF THE INVENTION

The invention provides for a simple and inexpensive fabrication to provide radial position retention to minimize the problems associated with single lobe attachment radial slop.

Thus, the invention may be embodied in a blade retention system for a rotating machine comprising: a hub having a plurality of shaped, generally axially extending, radially open slots at circumferentially spaced positions about the hub; a blade having complimentary shaped base portion axially received in a said slot and extending radially outwardly therefrom; and a radial retainer for spacing a radially inner end of said blade from a bottom surface of said slot, said retainer including a main body and a resilient component for resiliently urging the blade radially outwardly of said slot.

In an exemplary embodiment, the invention is embodied in a radial retainer for spacing a radially inner end of a turbine blade from a bottom surface of a respective slot, comprising: a generally planer main body including a base portion and a frame portion; and a resilient component, said resilient component being coupled to and extending from said base portion.

The invention may also be embodied in a method of radially retaining a turbine blade in a turbine blade slot, comprising: providing a hub having a plurality of shaped, generally axially extending, radially open slots at circumferentially spaced positions about the hub; engaging a blade having complimentary shaped base portion with a said slot so that said base of said blade is axially slidably disposed in said slot and said blade extends radially outwardly therefrom; and inserting a radial retainer between a radially inner end of said blade and a bottom surface of said slot, said radial retainer including a main body and a resilient component for resiliently urging the blade radially outwardly of said slot.

BRIEF DESCRIPTION OF DRAWINGS

These and other objects and advantages of this invention will be more completely understood and appreciated by careful study of the following more detailed description of the presently preferred exemplary embodiments of the invention, taken in conjunction with the accompanying drawings, in which.

DETAILED DESCRIPTION

Figure 1:
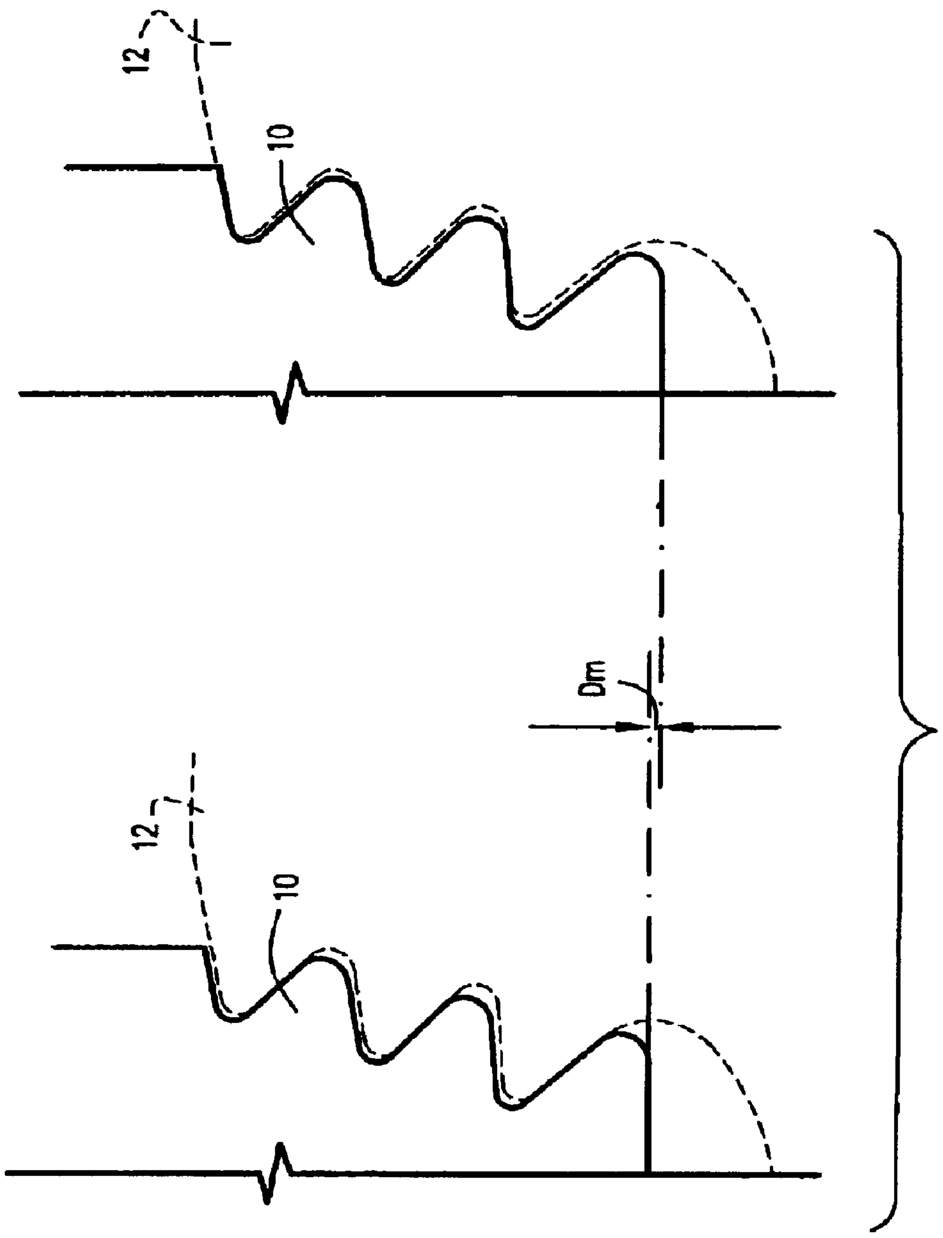
FIG. 1 is a schematic axial view comparing a turbine blade to disk multi-lobe attachment during running and in the installed, non-running position.
Figure 2:
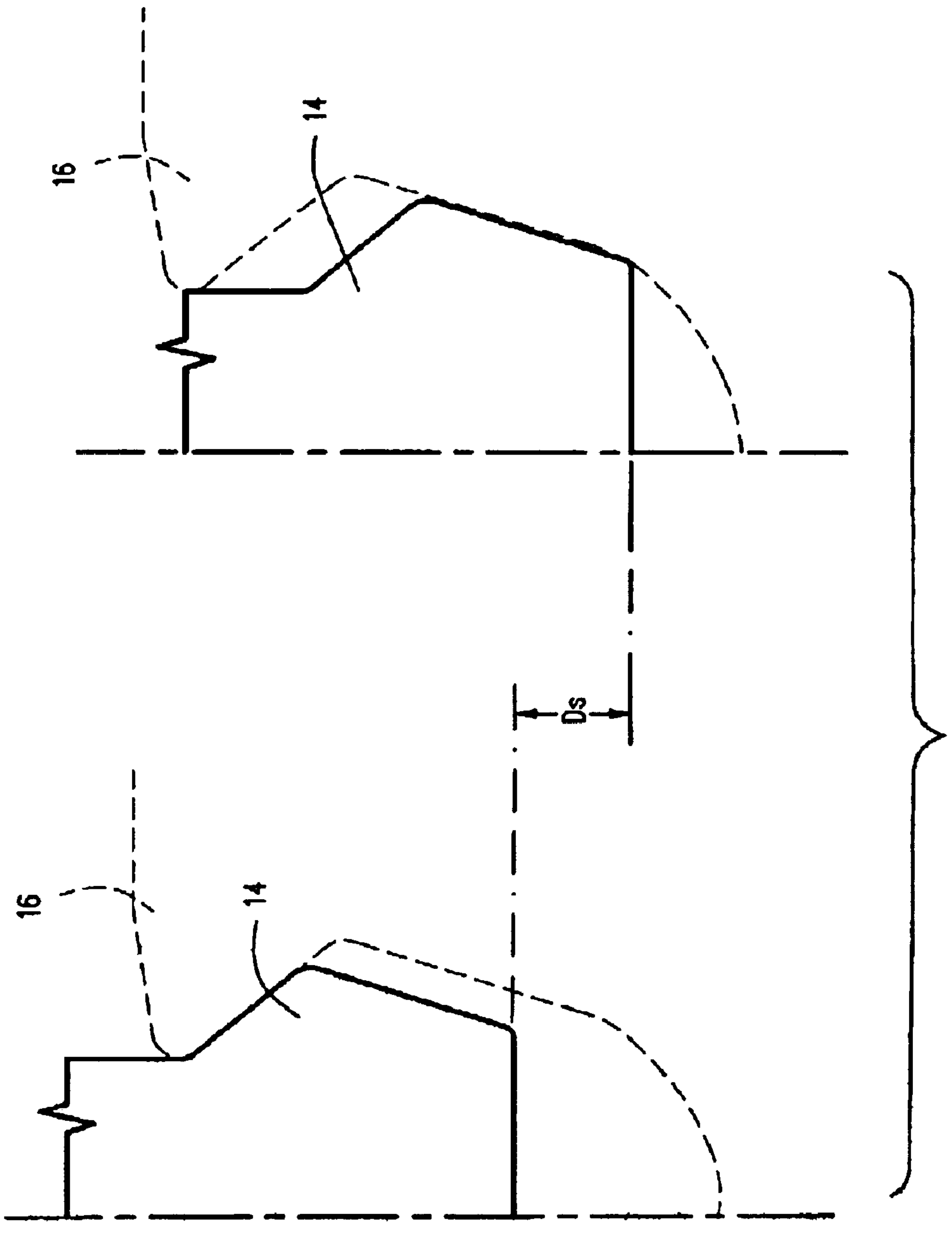
FIG. 2 is a schematic axial view comparing a turbine blade to disk single-lobe attachment during running and in the installed, non-running position.
Figure 4:
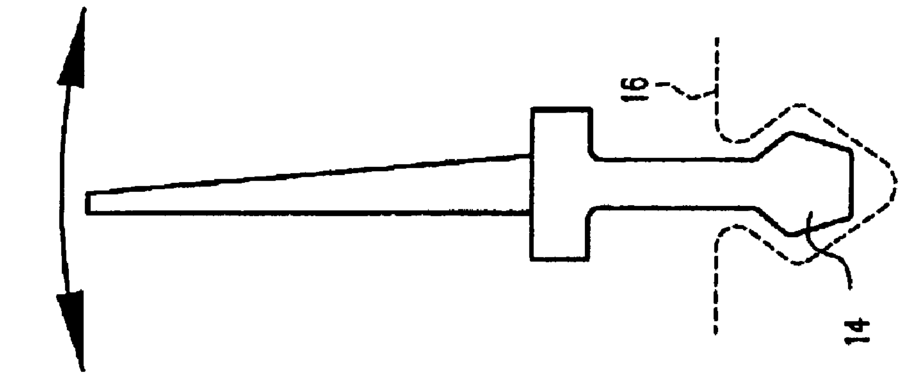
FIG. 4 is a schematic axial view of an installed single lobe turbine blade.
Figure 3:
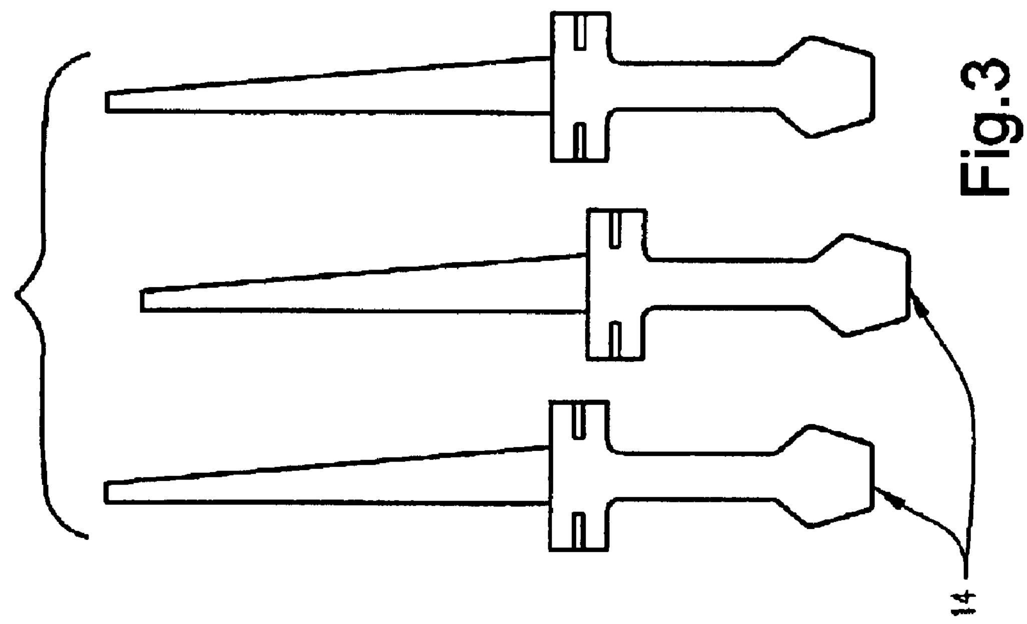
FIG. 3 is a schematic axial view of a plurality of circumferentially adjacent turbine blades.
Figure 6:
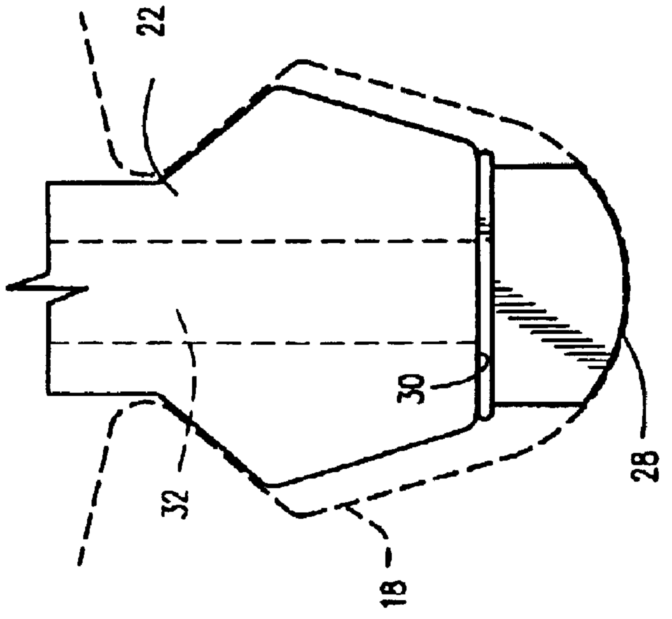
FIG. 6 is a schematic axial view of a single lobe turbine blade radially retained with a radial retainer structure provided as an embodiment of the invention.
Figure 5:
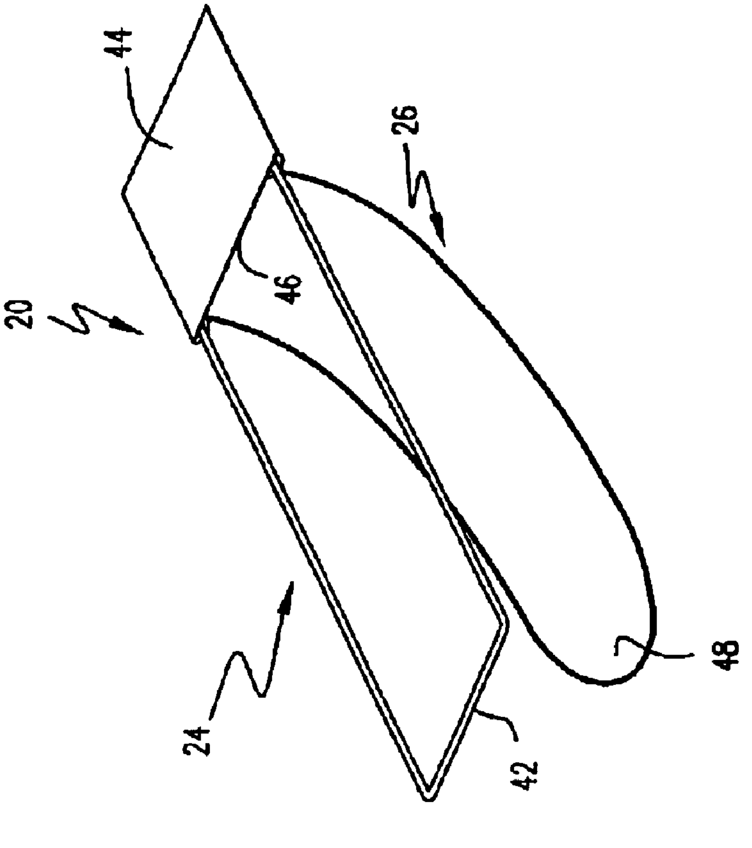
FIG. 5 is a schematic perspective view of a radial retainer embodying the invention.

The invention provides a fabrication for determining a radial position of a turbine blade to minimize radial position delta and thereby avoid problems associated with radial slop and mismatch among adjacent turbine blades. The radial retainer is inserted between the bottom face or radially inner face of the turbine blade and the bottom of the respective disk slot to radially space the turbine bottom face from the disk slot bottom to dispose the turbine blade generally in its running position. Referring to FIG. 6, a turbine blade 22 is shown seated in one of a plurality of dovetail slots 18 defined circumferentially of a rotor disk or hub.

In the illustrated embodiment, the radial retainer 20 resiliently urges the turbine blade 22 towards its running position and as such includes a main body 24 engaging the turbine blade 22 and a resilient component 26 for urging the turbine blade 22 and the disk bottom surface 28 in opposite directions. The main body 24 of the radial retainer distributes the urging force of the resilient component 26 to uniformly urge the turbine blade 22 radially outwardly. In the illustrated configuration, the bottom face 30 of the turbine blade 22 is generally flat to provide for generally contiguous contact between the radial retainer main body 24 and the turbine blade 22.

Figure 7:
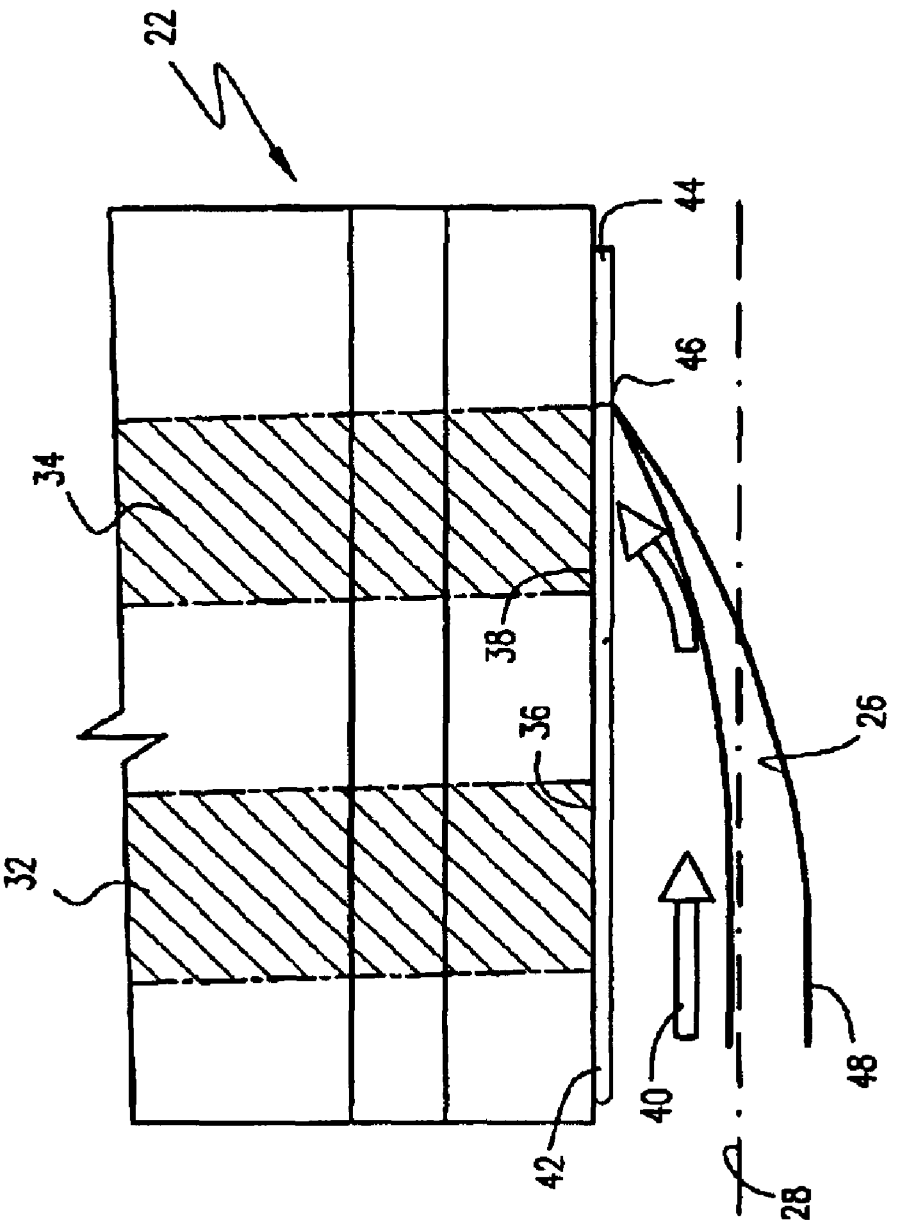
FIG. 7 is a side-elevational view showing the free-state and installed positions of a retainer embodying the invention.

As schematically shown in FIGS. 6 and 7, a plurality of cooling passages 32,34 are typically defined radially through at least a portion of the turbine blade 22. The radial retainer 20 of the illustrated embodiment advantageously provides a main body 24 configured to include a frame or perimeter band 42 for engaging the turbine blade 22 in surrounding relation to the cooling passage inlets 36,38 so that the radial retainer does not obstruct cooling air flow 40 into the turbine blade 22. In the illustrated embodiment, the main body 24 of the radial retainer includes a base portion 44 from which the frame portion 42 extends. More specifically, the base portion 44 is secured to each end of the perimeter or frame 42. The resilient component 26 is also coupled to the base portion 44 for urging the turbine blade and dovetail slot bottom surface 28 as mentioned hereinabove. A wire band is illustrated as an exemplary frame structure 42 to ensure that the retainer does not block the cooling passages in the blade, as mentioned above.

In an exemplary embodiment, the resilient component 26 is configured as a resilient plate spring or tongue secured at its proximal end 46 to the base portion 44 of the main body 24 and resiliently projecting to a free distal end 48. As illustrated e.g., in FIG. 7, the resilient tongue 26 is preformed to extend from a first plane including the main body 24 to a second plane including the free distal free end 48, the second plane being spaced from and generally parallel to the first plane. The tongue 26 is secured to the base portion 44 so as to project from the main body 24 of the radial retainer a distance greater than a target gap between the dovetail slot bottom 28 and the turbine blade bottom face 30. Accordingly, when the radial retainer 20 is disposed between the turbine blade 22 and the bottom surface 28 of the dovetail slot, the resilient tongue 26 is resiliently displaced towards the main body 24 of the retainer. It is the memory of the retainer sheet metal material, urging it to return to its free state from its installed position, that then resiliently urges the turbine blade 22 radially outwardly.

As will be appreciated and understood, an advantage of the resilient retainer tongue is that it allows easy, sliding placement of the radial retainer 20 into the dovetail slot while providing the force necessary to maintain the desired blade radial position. Moreover, the curved configuration of the resilient tongue advantageously acts as a scoop to guide and direct the cooling air 40 into the cooling passages 32,34 to maximize cooling flow and effect.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A blade retention system for a rotating machine comprising:

a hub having a plurality of shaped, generally axially extending, radially open slots at circumferentially spaced positions about the hub;

a blade having complimentary shaped base portion axially received in a said slot and extending radially outwardly therefrom; and a radial retainer for spacing a radially inner end of said blade from a bottom surface of said slot, said retainer including a main body and a resilient component for resiliently urging the blade radially outwardly of said slot, wherein said main body defines at least one opening for the passage of cooling air through said opening and into a cooling passage defined radially of the turbine blade.

2. A blade retention system as in claim 1, wherein said main body includes a frame portion and a base portion, said resilient component being coupled to and extending from said base portion.

3. A blade retention system as in claim 2, wherein said frame portion defines said at least one opening for the passage of cooling air.

4. A blade retention system as in claim 3, wherein said frame comprises a wire perimeter band secured at each end to said base portion and defining an elongated open frame.

5. A blade retention system as in claim 1, wherein said resilient component is formed as a resilient sheet metal strip.

6. A blade retention system as in claim 2, wherein said resilient component is formed as a resilient sheet metal strip.

7. A blade retention system as in claim 5, wherein said resilient sheet metal strip is coupled at a proximal end thereof to said main body and terminates at a free distal end, said resilient sheet metal strip having a pre-formed configuration to extend from a first plane including said main body to a second plane including said free distal end thereof, said second plane being spaced from and generally parallel to said first plane.

8. A blade retention system as in claim 7, wherein said metal strip is resilient so as to have a first, rest position wherein said distal end is spaced from said first plane of said main body by a first distance and a second, installed position wherein said distal end is spaced from said first plane by a second distance, said second distance being less than said first distance.

9. A blade retention system as in claim 1, wherein said radial retainer is disposed between said radially inner end of said blade and the bottom surface of said slot, and the resilient component is compressed to a radial height less than a radial height when disengaged from the turbine blade and slot.

10. A radial retainer for spacing a radially inner end of a turbine blade from a bottom surface of a respective slot, comprising:

a generally planer main body including a base portion and a frame portion; and a resilient component, said resilient component being coupled to and extending from said base portion, wherein said frame portion defines at least one opening for the passage of cooling air into a cooling passage of the turbine blade.

11. A radial retainer as in claim 10, wherein said frame comprises a wire perimeter band secured at each end to said base portion and defining an elongated open frame.

12. A radial retainer as in claim 10, wherein said resilient component is formed as a resilient sheet metal strip.

13. A radial retainer as in claim 12, wherein said resilient sheet metal strip is coupled at a proximal end thereof to said base portion and terminates at a free distal end, said resilient sheet metal strip having a pre-formed configuration to extend from a first plane including said planer main body to a second plane including said second, free end thereof, said second plane being spaced from and generally parallel to said first plane, and wherein said metal strip is resilient so as to have a first, rest position wherein said distal end is spaced from said first plane of said main body by a first distance and a second, installed position wherein said distal end is spaced from said first plane by a second distance, said second distance being less than said first distance.

14. A radial retainer as in claim 10, wherein said resilient component is coupled at a proximal end thereof to said base portion and terminates at a free distal end, said resilient sheet metal strip having a pre-formed configuration to extend from a first plane including said planer main body to a second plane including said second, free end thereof, said second plane being spaced from and generally parallel to said first plane and wherein said resilient component is resilient so as to have a first, rest position wherein said distal end is spaced from said first plane of said main body by a first distance and a second, installed position wherein said distal end is spaced from said first plane by a second distance, said second distance being less than said first distance.

15. A method of radially retaining a turbine blade in a turbine blade slot, comprising:

providing a hub having a plurality of shaped, generally axially extending, radially open slots at circumferentially spaced positions about the hub;

engaging a blade having complimentary shaped base portion with a said slot so that said base of said blade is axially slidably disposed in said slot and said blade extends radially outwardly therefrom; and inserting a radial retainer between a radially inner end of said blade and a bottom surface of said slot, said radial retainer including a main body and a resilient component for resiliently urging the blade radially outwardly of said slot, wherein said main body defines at least one opening for the passage of cooling air through said opening and into a cooling passage defined radially of the turbine blade.

16. A method as in claim 15, wherein said radial retainer main body includes a frame portion and a base portion, said resilient component being coupled to and extending from said base portion.

17. A method as in claim 16, wherein said frame portion defines said at least one opening for the passage of cooling air.

18. A method as in claim 17, wherein said resilient component is formed as a resilient sheet metal strip, and further comprising guiding cooling flow into said cooling passage with said resilient component.

19. A method as in claim 15, wherein said resilient component is formed as a resilient sheet metal strip.

20. A blade retention system for a rotating machine comprising:

a hub having a plurality of shaped, generally axially extending, radially open slots at circumferentially spaced positions about the hub;

a blade having complimentary shaped base portion axially received in a said slot and extending radially outwardly therefrom; and a radial retainer for spacing a radially inner end of said blade from a bottom surface of said slot, said retainer including a main body and a resilient component for resiliently urging the blade radially outwardly of said slot, wherein said main body includes a frame portion and a base portion, said resilient component being coupled to and extending from said base portion.

* * * * *